United States Patent
Espedal et al.

(10) Patent No.: US 11,939,654 B2
(45) Date of Patent: Mar. 26, 2024

(54) METHOD FOR PRODUCING A CORROSION AND HIGH TEMPERATURE RESISTANT ALUMINUM ALLOY EXTRUSION MATERIAL

(71) Applicant: HYDRO EXTRUDED SOLUTIONS AS, Oslo (NO)

(72) Inventors: Arvid Espedal, Mårslet (DK); Xiao-Jun Jiang, Haugesund (NO); Minxia Li, Suzhou (CN)

(73) Assignee: HYDRO EXTRUDED SOLUTIONS AS, Oslo (NO)

( * ) Notice: Subject to any disclaimer, the term of this patent is extended or adjusted under 35 U.S.C. 154(b) by 0 days.

(21) Appl. No.: 17/799,892

(22) PCT Filed: Feb. 16, 2021

(86) PCT No.: PCT/EP2021/053784
§ 371 (c)(1),
(2) Date: Aug. 15, 2022

(87) PCT Pub. No.: WO2021/165266
PCT Pub. Date: Aug. 26, 2021

(65) Prior Publication Data
US 2023/0090974 A1    Mar. 23, 2023

(30) Foreign Application Priority Data

Feb. 17, 2020  (SE) .................................. 2050177-1
Feb. 21, 2020  (SE) .................................. 2050198-7

(51) Int. Cl.
C22F 1/04     (2006.01)
B32B 15/01    (2006.01)
C22C 21/00    (2006.01)

(52) U.S. Cl.
CPC .............. *C22F 1/04* (2013.01); *B32B 15/017* (2013.01); *C22C 21/00* (2013.01)

(58) Field of Classification Search
None
See application file for complete search history.

(56) References Cited

U.S. PATENT DOCUMENTS

| | | | |
|---|---|---|---|
| 2003/0165397 A1* | 9/2003 | Auran | C22C 21/02 420/541 |
| 2017/0306465 A1* | 10/2017 | Skubich | C22F 1/002 |
| 2018/0016665 A1 | 1/2018 | Parson et al. | |

FOREIGN PATENT DOCUMENTS

| | | |
|---|---|---|
| CN | 1264431 | 8/2000 |
| CN | 1273614 | 11/2000 |

(Continued)

OTHER PUBLICATIONS

International Searching Authority, "International Search Report" issued for corresponding International Application No. PCT/EP2021/053784, dated May 20, 2021 (3 pages).

(Continued)

*Primary Examiner* — Daniel J. Schleis
(74) *Attorney, Agent, or Firm* — Wenderoth, Lind & Ponack, L.L.P.

(57) ABSTRACT

A method for producing a corrosion resistant aluminum alloy extrusion. The method includes providing molten alloy with a composition comprising ≤0.30, % by weight of silicon, ≤0.40, % by weight of iron, 0.01-0.6% manganese, ≤0.30, % magnesium, ≤0.70, % zinc, 0.05-0.35% chromium, 0.02-0.20% zirconium, ≤0.25% titanium, ≤0.20% vanadium, ≤0.10% copper, up to 0.15% by weight of other impurities, each not greater than 0.03% by weight, and the balance aluminum. The method includes casting the alloy into an extrusion billet, subjecting the billet to a homogenization treatment at a holding temperature of 550 to 620

(Continued)

Figure 1:
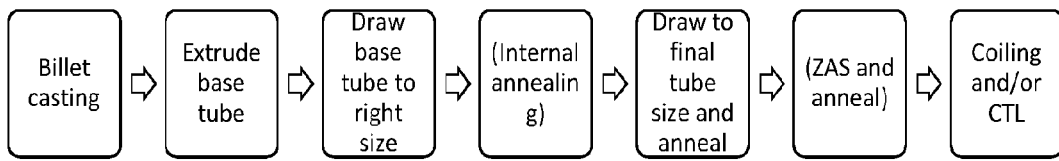

deg.C for 6 to 10 hours, heating the billet to a temperature of 400 to 550 deg.C, and extruding the billet to a tube.

10 Claims, 1 Drawing Sheet

(56) References Cited

FOREIGN PATENT DOCUMENTS

| | | |
|---|---|---|
| CN | 1359427 | 7/2002 |
| CN | 103397228 | 11/2013 |
| CN | 104302797 | 1/2015 |
| CN | 108531783 A | 9/2018 |
| EP | 2832873 A1 | 2/2015 |
| JP | 2009 249727 A | 10/2009 |

OTHER PUBLICATIONS

Chinese Office Action dated Jul. 6, 2023, in Chinese Patent Application No. 202010354955.2, with English translation.
Chinese Office Action dated Jul. 6, 2023, in Chinese Patent Application No. 202180014586.5, with English translation.

* cited by examiner

METHOD FOR PRODUCING A CORROSION AND HIGH TEMPERATURE RESISTANT ALUMINUM ALLOY EXTRUSION MATERIAL

The invention relates to a process for manufacture of a high corrosion resistant aluminium alloy extrusions, especially extruded tubes intended to be used for manufacture of automotive and HVAC & R air conditioning units, such as heat exchanger tubing or refrigerant carrying tube lines, or generally fluid carrying tube lines in e.g. in the HVAC & R field. The process produces extrusions with extensively improved resistance to pitting corrosion and enhanced mechanical properties especially in bending and end-forming.

The introduction of aluminium alloy materials for automotive heat exchange components is widespread, applications including both engine cooling and air conditioning systems. Aluminium alloy tubing for HVAC & R applications is also increasingly used. In the air conditioning systems, the aluminium components include the condenser, the evaporator and the refrigerant routing lines or fluid carrying lines. In service these components may be subjected to conditions that include mechanical loading, vibration, stone impingement and road/environmental chemicals (e.g. salt water environments during winter driving conditions). Aluminium alloys of the AA3000 series type have found extensive use for these applications due to their combination of relatively high strength, light weight, corrosion resistance and extrudability. The AA3000 series alloys (like AA3102, AA3003 and AA3103), however, suffers from extensive pitting corrosion when subjected to corrosive environments, leading to failure of the automotive and HVAC & R component. To be able to meet the rising targets/requirements for longer life on the automotive and HVAC & R systems new alloys have been developed with significantly better corrosion resistance. Especially for condenser tubing, the 'long life' alloy alternatives have recently been developed, such as those disclosed in U.S. Pat. No. 5,286,316 and WO-A-97/46726. The alloys disclosed in these publications are generally alternatives to the standard AA3102 or AA1100 alloys used in condenser tubes, i.e. extruded tube material of relatively low mechanical strength. Due to the improved corrosion performance of the condenser tubing the corrosion focus have shifted towards the next area to fail, the manifold and the refrigerant carrying tube lines. Additionally, the tendency towards using more under vehicle tube runs, e.g. rear climate control systems, requires improved alloys due to the more heavy exposure towards the road environment. The fluid carrying tube lines are usually fabricated by means of extrusion and final precision drawing in several steps to the final dimension, and the dominating alloys for this application are AA3003 and AA3103 with a higher strength and stiffness compared to the AA3102 alloy. The new requirements have therefore created a demand for an aluminium alloy with processing flexibility and mechanical strength similar or better than the AA3003/AA3103 alloys, but with improved corrosion resistance.

In U.S. Pat. No. 4,357,397 there is described an aluminium alloy containing relatively high amounts of Mn, Fe and Zn apart from some quantities of Si, Cu Mg, Cr and Ti. In table 1 of this patent specification there is disclosed an aluminium alloy consisting of 0.40% by weight Mn, 0.30% by weight Fe, 0.60% by weight Zn, 0.15% by weight Si, 0.02% by weight Cu 0.02% by weight Mg, 0.05% by weight Cr and 0.01% by weight Ti. This alloy is intended as a sacrificial brazing fin stock and therefor lacks optimalisation with respect to characteristics such as improved formability, especially drawability and corrosion resistance.

SUMMARY OF THE INVENTION

The object of this invention is to provide a process for producing an extrudable, drawable and brazeable aluminium extrusion that has improved corrosion resistance and is suitable for use in thin wall, fluid carrying tube lines. It is a further object of the present invention to provide an aluminium alloy tube for use in heat exchanger applications. A still further object of the present invention is to provide an aluminium alloy with improved formability during bending and end-forming operations.

The present invention provides an aluminium extrusion with excellent extrusion resistance, drawability, formability, high strength, good brazeability and excellent corrosion resistance for automotive lines, solar collectors, macro MPE, inner grooved tube (both straight enhanced and helical inner grooved) application.

DETAILED DESCRIPTION OF THE INVENTION

The invention will now be described in more detail with reference to the figures:

FIG. 1: Process flow chart for making the aluminium alloy tubes

Figure 2:
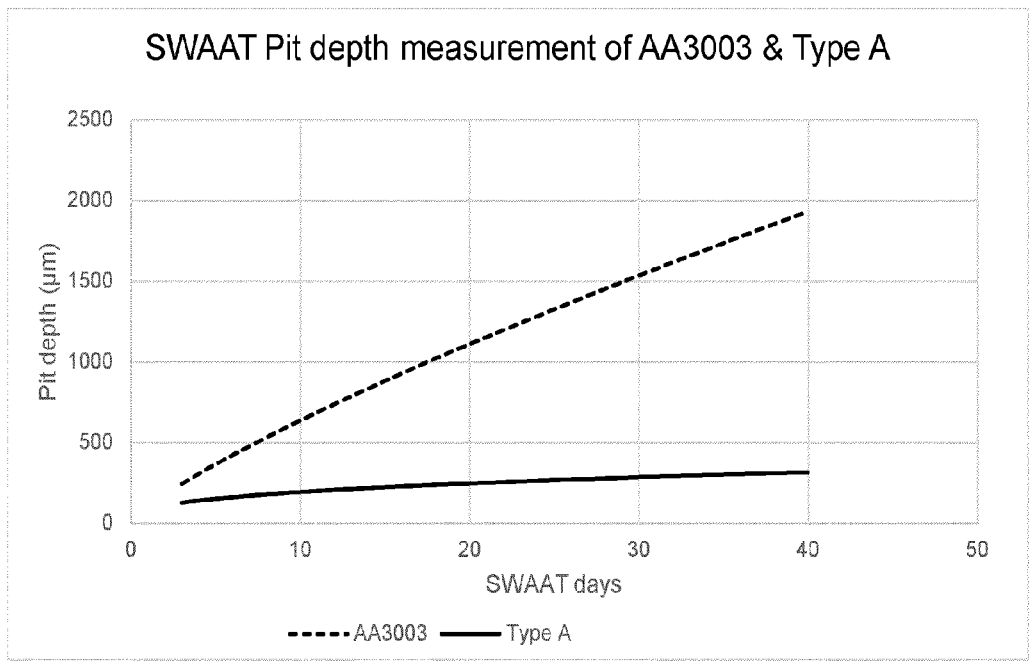

FIG. 2: Corrosion result for a tube A according to the invention and a standard AA3003 alloy tube tested in SWAAT (16×1.6 mm, O temper. SWAAT test is according to ASTM G85-A3.

Figure 3:
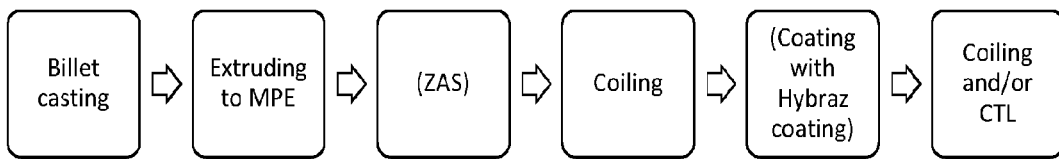
Figure 4:
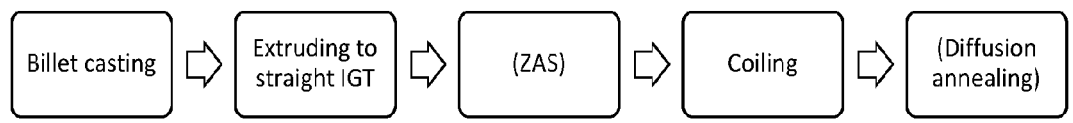

FIG. 3: Process route for Multi Port Extrusion, Multi Port Extrusion+Zinc Arc Spray (ZAS) or Multi Port Extrusion+Hybraz coating FIG. 4: Process route for extruded straight enhanced tube (+ZAS)

The objects and advantages of the invention are obtained by use of an aluminium-based alloy, consisting of 0.05-0.15% by weight of silicon, 0.06-0.35% by weight of iron, 0.01-1.10% by weight of manganese, 0.15-0.30% by weight of magnesium, 0.05-0.70% by weight of zinc, 0-0.25% by weight of chromium, 0-0.20% by weight of zirconium, 0-0.25% by weight of titanium, 0-0.10% by weight of copper, up to 0.15% by weight of other impurities, each not greater then 0.03% by weight and the balance aluminium.

The manganese content should be 0.01-1.10% by weight, preferably between 0.30-0.60% by weight, more preferably 0.40-0.50% by weight. The addition of manganese contributes to the strength, however, it is a major point to reduce the negative effect manganese have with respect to precipitation of manganese bearing phases during final annealing, which contributes to a coarser final grain size.

Addition of magnesium is made in the range of 0.05-0.30% by weight, preferably 0.15-0.30, most preferably 0.15-0.20% by weight, results in a refinement of the final grain size (due to storage of more energy for recrystallization during deformation) as well as improvements the strain hardening capacity of the material. In total this means improved formability during for instance bending and end-forming of tubes. Magnesium also has a positive influence on the corrosion properties by altering the oxide layer. The content of magnesium is preferably below 0.3% by weight due to its strong effect in increasing extrudability. Additions above 0.3% by weight are generally incompatible with good brazeability.

In view of the polluting effect of zinc (ex. even small zinc concentrations negatively affect the anodising properties of AA6000 series alloy), the level of this element should be kept low to make the alloy more recyclable and save cost in the cast house. Otherwise, zinc has a strong positive effect on the corrosion resistance and may be added up to 0.70% by weight, but for the reasons given above the amount of zinc is preferably between 0.05-0.70% by weight, more preferably 0.10-0.30% by weight.

Preferably the iron content of the alloy according to the invention is between ≤0.40 by weight, preferably 0.06-0.35% by weight. In general, a low iron content, preferably 0.06-0.18% in weight, is desirable for improved corrosion resistance, as it reduces the amount of iron rich particles which generally creates sites for pitting corrosion attack. Going too low in iron, however, could be difficult from a cast house standpoint of view, and also, has a negative influence on the final grain size (due to less iron rich particles acting as nucleation sites for recrystallization). To counterbalance the negative effect of a relatively low iron content in the alloy other elements could be added for grain structure refinement.

The silicon content is between ≤0.30% by weight, preferably 0.05-0.15% by weight, more preferably between 0.08-0.13% by weight. It is important to keep the silicon content within these limits to control and optimize the size distribution of AlFeSi-type particles (both primary and secondary particles), and thereby controlling the grain size in the final product.

To improve the corrosion resistance, some addition of chromium to the alloy is desirable. Addition of chromium, however, increases the extrudability and influences negatively on the tube drawability and therefore the level used is ≤0.35% by weight, 0.05-0.25%, more preferably 0.05-0.15% by weight.

In order to optimize the resistance against corrosion, the zirconium content shall be ≤0.20% by weight, preferably between 0.02-0.20% by weight, more preferably between 0.10-0.18% by weight. In this range the extrudability of the alloy is practically not influenced by any change in the amount of zirconium.

Further optimising of the corrosion resistance can be obtained by adding titanium, the content should be ≤0.20% by weight, preferably 0.05-0.25% by weight, more preferably 0.10-0.15% by weight. No significant influence on the extrudability is found for these titanium levels.

The copper content of the alloy should be kept as low as possible, and ≤0.10% by weight, preferably below 0.01% by weight, due to the strong negative effect on corrosion resistance and also due to the negative effect on extrudability even for small additions. The present invention provides a method for producing a corrosion resistant aluminium alloy extrusion, consisting of an alloy with the composition
≤0.30, preferably 0.05-0.15% by weight of silicon,
≤0.40, preferably 0.06-0.35% by weight of iron,
0.01-1.1% by weight of manganese,
≤0.30, preferably 0.15-0.30% by weight of magnesium,
≤0.70, preferably 0.05-0.70%, more preferably 0.10-0.30% by weight of zinc,
≤0.35, preferably 0.25% by weight of chromium,
≤0.20% by weight of zirconium,
≤0.25, preferably 0.05-0.25% by weight of titanium,
≤0.20% by weight vanadium
≤0.10% by weight of copper
up to 0.15% by weight of other impurities, each not greater than 0.03% by weight, and the balance aluminium, the method comprising the steps;
a) casting the molten alloy into extrusion billet,
b) subjecting the billet to a homogenization treatment at a holding temperature of 550 to 620 deg.C for 6 to 10 hours,
c) heating the billet to a temperature of 400 to 550 deg.C,
d) extruding the billet to a tube.

In the following example the manufacturing process for producing the extruded tubes is described.

Table 1

EXAMPLE

The alloying elements are added into a melting furnace to obtain molten metal of the alloy chemistry shown in Table 1.

| Alloy | Si | Fe | Cu | Mn | Mg | Cr | Zr | Zn | Ti | Ni | V | Others each | Others total |
|---|---|---|---|---|---|---|---|---|---|---|---|---|---|
| Alloy A | 0.10 | 0.12 | — | 0.46 | 0.18 | — | — | 0.22 | ≤0.13 | — | — | ≤0.03 | ≤0.15 |

The chemical composition of the billets was determined by means of optical emission spectroscopy The molten metal is cast into extrusion billet. The billet is subjected to a homogenization treatment at a holding temperature of 550 to 620 deg.C for 6 to 10 hours. The purpose of this heat treatment is to soften billet for extruding it through the die and to reach a sufficient temperature and attain mechanical properties. If the temperature is too low, billet will be too hard to push through the press and the die could be damaged. If the temperature is too high, the surface quality of the profile could be poor and the extrusion speed has to be reduced. Thereafter, the billet is heated to a temperature of 400 to 550 deg.C to achieve the desired temperature. If the temperature is too low, the billet will be too hard to push, if temperature is too high tube surface defects, such as pickup, web tearing will occur.

The billet is then then extruded to a Multi Port Extrusion, an extruded straight enhanced tube, or a base tube for Precision Drawn Tube and/or helical inner grooved tube depending on the application.

The process flow chart for making the aluminium alloy tubes are shown in FIG. 1.

The billet is preheated to temperature 450 to 500 deg with 60 to 120 degC/meter taper (temperature gradient along the billet length) before extrusion to a tube shape, the die is preheated to 450 to 550 deg and soaked 2 to 10 hours before using. Extrusion runout speed of the tube is controlled to 40 to 100 m/min to get a good quality tube surface. The extruded tube can be coiled during extrusion and can be extruded to straight tube. The tube is preferably cooled by quenching as soon as possible when it exits the press. Runout temperature should preferably be controlled to lower than 590 degC to attain an optimal microstructure, surface quality and mechanical properties.

The base tube can be drawn to different sizes by different outer diameters and wall reduction. The drawn tube can be produced to H112, H12, H14, H18 temper and can be annealed after drawing to O temper. The preferred annealing process is heating to 400 to 480 degC and holding for 0 to 3 hours, preferably for 1-3 hours. Annealing for 0 hours means putting the tubes in the furnace before the annealing temperature is reached and taking them out as the desired temperature is reached.

After extrusion or drawing the tube can be coated with zinc, for example by arc spray, for corrosion protection. Zinc average load can be 3 g/m2 to 10 g/m2. Tube with zinc coating need to be exposed to a diffusion heat treatment before delivery. The heat treatment is made by heating the tube to 300 to 600 degC and soaking 2 to 10 hours. And zinc diffusion depth into tube wall can be 100 um to 300 um.

To demonstrate the improved corrosion resistance of the inventive aluminium alloy extrusion over known prior art materials, the corrosion resistance was tested using the so-called SWAAT test (Sea Water Acetic Acid Test). The test was performed according to ASTM G85 Annex A3, with alternating 30 minutes spray periods and 90 minutes soak periods at above 98% relative humidity. The electrolyte used was artificial sea water acidified with acetic acid to a pH of 2.8 to 3.0 and a composition according to ASTM standard D1141. The temperature in the chamber was kept at 49° C. The test was run in an Ascott Salt Spray Chamber. As can be seen in FIG. 2 the drawn tube of type A alloy produced with the process according to the invention has a much higher corrosion resistance than typical AA3003 alloy extrusion.

The electric conductivity of the extrusion billet after homogenization is give in table 2. The measurement was made according to ASTM E 1004 Electromagnetic (Eddy-Current) Measurements of Electrical Conductivity to verify that the heat treatment process was done correctly.

TABLE 2

| Specification | | | | |
|---|---|---|---|---|
| Min | Max | Median | Standard deviation | |
| 30 | 50 | 38 | 2.0 | % IACS |

The mechanical properties of the final tube according to the invention in O/H111 temper and as brazed are shown in Table 3:

TABLE 3

| Temper | O/H111 | As Brazed* |
|---|---|---|
| Yield strength $R_{p0.2}$ [MPa] | min. 40 | min. 35 |
| Tensile strength $R_m$ [MPa] | min. 85 | min. 80 |
| Elongation A5 [%] | min. 30 | min. 25 |

*the post braze values depend on the brazing cycle

Testing of mechanical properties of annealed tubes were carried out on a Zwick Z100 tensile testing machine in accordance with the NS-EN-ISO 6892-1-B standard. In the testing the E-module was fixed to 70000 N/mm2 during the entire testing. The speed of the test was constant at 10 N/mm2 per second until YS (yield strength) was reached, whilst the testing from YS until fracture appeared was 40% Lo/min, Lo being the initial gauge length.

The results show that the aluminium alloy extrusion produced with the inventive process gives a significantly better corrosion resistance than aluminium extrusions produced according to the standard procedure.

It was found that during extrusion of the different alloys, the extrusion pressures obtained for the tested alloys were equal to or maximum 5-6% higher compared with the 3103 reference alloy. This is regarded as a small difference and it should be noted that all alloys were run at the same billet temperature and ram speed (no press-parameter optimisation done in this test).

Surface finish after extrusion, especially on the interior of the tube, is particularly important in this application because the tube is to be cold drawn to a smaller diameter and wall thickness. Surface defects may interfere with the drawing process and result in fracture of the tube during drawing. All the alloys investigated during the tests showed good internal surface appearance.

The invention claimed is:

1. A method for producing a corrosion resistant aluminum alloy tube, the method comprising:
    providing a molten alloy with a composition consisting of:
        0.05-0.15% by weight of silicon,
        less than or equal to 0.40% by weight of iron,
        0.01-0.6% by weight of manganese,
        less than or equal to 0.30% by weight of magnesium,
        less than or equal to 0.70% by weight of zinc,
        0.05-0.35% by weight of chromium,
        0.02-0.20% by weight of zirconium,
        less than or equal to 0.25% by weight of titanium,
        less than or equal to 0.20% by weight vanadium,
        less than or equal to 0.10% by weight of copper,
        up to 0.15% by weight of other impurities, each not greater than 0.03% by weight, and
        a balance of aluminum;
    casting the molten alloy into an extrusion billet;
    subjecting the extrusion billet to a homogenization treatment at a holding temperature of 550 to 620° C. for 6 to 10 hours;
    heating the extrusion billet to a temperature of 400 to 550° C.; and
    extruding the extrusion billet to a tube.

2. The method according to claim 1, further comprising:
    annealing the extruded tube by heating the extruded tube to 400 to 480° C.; and
    holding for 0 to 3 hours.

3. The method according to claim 1, wherein the tube is one of a Multi Port Extrusion, an extruded straight enhanced tube, a base tube for PDT, or a base tube for a helical inner grooved tube.

4. The method according to claim 1, wherein, in the alloy, the manganese is present in an amount of 0.30-0.60% by weight.

5. The method according to claim 1, wherein, in the alloy, the zinc is present in an amount of 0.05-0.70% by weight.

6. The method according to claim 1, wherein, in the alloy, the iron is present in an amount of 0.06-0.35% by weight.

7. The method according to claim 1, wherein, in the alloy, the chromium is present in an amount of 0.05-0.15% by weight.

8. The method according to claim 1, wherein, in the alloy, the magnesium is present in an amount of 0.15-0.30% by weight.

9. The method according to claim 1, wherein, in the alloy, the titanium is present in an amount of 0.05-0.25% by weight.

10. The method according to claim 1, wherein, in the alloy, the copper is present in an amount of below about 0.01% by weight.

\* \* \* \* \*